US012506277B2

(12) United States Patent
Yoon et al.

(10) Patent No.: US 12,506,277 B2
(45) Date of Patent: Dec. 23, 2025

(54) COMPACT FREQUENCY RECONFIGURABLE ARRAY ANTENNA BASED ON DIAGONALLY PLACED MEANDER-LINE DECOUPLERS AND PIN DIODES FOR MULTI-RANGE WIRELESS COMMUNICATION

(71) Applicant: University of Florida Research Foundation, Inc., Gainesville, FL (US)

(72) Inventors: Yong Kyu Yoon, Gainesville, FL (US); Payman Pahlavan, Gainesville, FL (US); Suk-il Choi, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 256 days.

(21) Appl. No.: 18/351,303

(22) Filed: Jul. 12, 2023

(65) Prior Publication Data

US 2024/0047895 A1 Feb. 8, 2024

Related U.S. Application Data

(60) Provisional application No. 63/395,143, filed on Aug. 4, 2022.

(51) Int. Cl.

*H01Q 21/06* (2006.01)
*H01Q 5/385* (2015.01)
*H01Q 9/04* (2006.01)

(52) U.S. Cl.

CPC ........... *H01Q 21/065* (2013.01); *H01Q 5/385* (2015.01); *H01Q 9/0442* (2013.01)

(58) Field of Classification Search

CPC .... H01Q 21/065; H01Q 5/385; H01Q 9/0442; H01Q 1/523; H01Q 5/321

See application file for complete search history.

(56) References Cited

U.S. PATENT DOCUMENTS

2003/0164797 A1* 9/2003 Ngai ...................... H01Q 1/523 343/700 MS
2019/0334235 A1* 10/2019 Yoon ...................... H01Q 21/06
2022/0344806 A1* 10/2022 Cho ......................... H01Q 1/48

* cited by examiner

*Primary Examiner* — Daniel D Chang
(74) *Attorney, Agent, or Firm* — Thomas | Horstemeyer, LLP

(57) ABSTRACT

The present disclosure describes various systems and apparatuses for a compact frequency reconfigurable array antenna and methods related thereto. An exemplary array antenna system comprises a substrate; an array of patch antennas positioned on the substrate; a plurality of PIN diodes placed on a top surface of the substrate, wherein individual PIN diodes are located in individual gaps between respective ones of the patch antennas; and a plurality of meander-line (ML) complementary split-ring resonator (CSRR) decouplers placed on a bottom surface of the substrate, wherein individual ML-CSRR decouplers are placed under individual patch antennas in a diagonal direction.

20 Claims, 19 Drawing Sheets

COMPACT FREQUENCY RECONFIGURABLE ARRAY ANTENNA BASED ON DIAGONALLY PLACED MEANDER-LINE DECOUPLERS AND PIN DIODES FOR MULTI-RANGE WIRELESS COMMUNICATION

CROSS-REFERENCE TO RELATED APPLICATION

This application claims priority to co-pending U.S. provisional application entitled, "Compact Frequency Reconfigurable Array Antenna Based on Diagonally Placed Meander-Line Decouplers and Pin Diodes for Multi-Range Wireless Communication," having application Ser. No. 63/395,143, filed Aug. 4, 2022, which is entirely incorporated herein by reference.

STATEMENT REGARDING FEDERALLY SPONSORED RESEARCH OR DEVELOPMENT

This invention was made with government support under 2030122 awarded by the National Science Foundation. The government has certain rights in the invention

BACKGROUND

With the increased number of Internet-of-Things (IoT) devices and the advancement of its application these days, the demands for using multiple frequency spectra in a single device are rapidly growing. However, the number of antennas to meet the demands requires large device areas, which is not aligned with the current technology trend for minimized and lightweight gadgets in the 5G communications era. Such an issue may be mitigated by designing an antenna that can have its operating frequency reconfigurable, and thus it is able to reduce the weight, dimension, and cost while meeting broadband frequency coverage.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems and apparatuses for a compact frequency reconfigurable array antenna and methods related thereto. In accordance with embodiments of the present disclosure, meander-line (ML) complementary split-ring resonator (CSRR) decouplers and PIN diodes are integrated in the array antenna to reduce mutual coupling and to act as frequency switches, respectively.

Given that requests for multi-range communication equipment are increasing in many fields such as smart cities, agriculture, and security, a compact array antenna of the present disclosure can find applications in many communication schemes and devices, such as those related to short-range wireless communications and low power wide area network communications. For example, low power wide area network (LPWAN) technology, such as LoRaWAN and Sigfox, has been getting attention in recent wireless communication systems because it has several advantages, such as low power requirement, low deployment cost, and extended coverage compared with other IoT applications. LPWAN ensures communications from 10 to 40 km in the rural area and up to 5 km in the urban area. In this sense, LPWAN technology fits well to be mounted on the unmanned aerial vehicle (UAV) and adapted for tracking assets, logistics, transportation, and smart cities.

Especially, when a disaster strikes, LPWAN technology can help recover communications in disaster areas by substituting a dysfunctional base station. In particular, an unexpected disaster such as flooding, tornado, hurricane, earthquakes, or terrorism causes to disable network operation, which leads to people being trapped in a dangerous situation and missing their 72 golden hours for rescue. On Dec. 10, 2021, a violent tornado hit Western Kentucky, producing severe damage in numerous towns including death and missing cases. Mobile and internet communication was obliterated. To make it worse, the emergency operation center lost the ability to transmit radio communications, preventing the trapped people from reaching the rescue team. Deepak et al. has reported that the aerial base station (UAVs) would replace the failed base station in a disaster area and directly connect to USER within the ISM band spectrum (915 MHz in North America). See G. C. Deepak et al., "An Overview of Post-Disaster Emergency Communication Systems in the Future Networks," IEEE Wireless Communications, pp.132-139, 2019.

Figure 1:
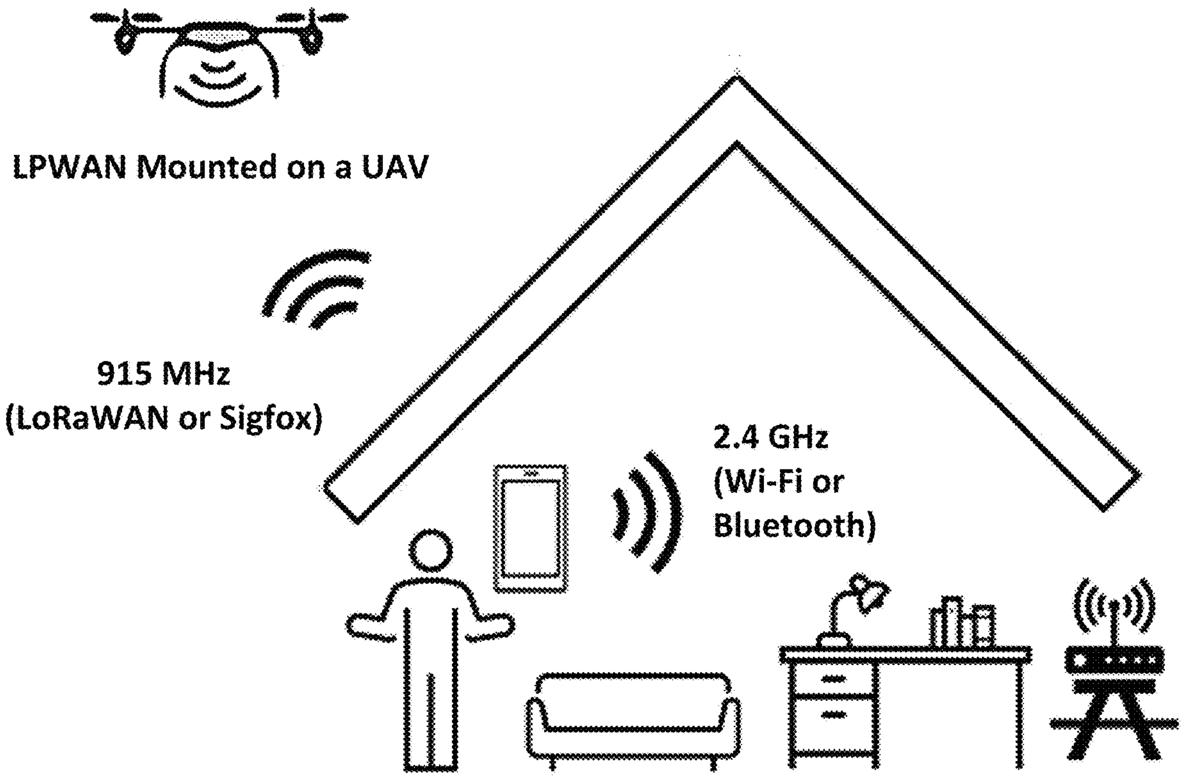
FIG. 1 illustrates an exemplary multi-range wireless communication system.

In accordance with one exemplary embodiment of the present disclosure, a compact frequency reconfigurable 2×2 antenna array operating at 914 MHz (LPWAN) and 2.4 GHz (Bluetooth and Wi-Fi), depending on the situation, is shown in FIG. 1. The reconfigurability can be realized with PIN diodes connected between the patch elements. PIN diodes have several advantages compared to varactor diodes and MEMS switches. In particular, PIN diodes have a fast response time, low insertion loss, good isolation, high power handling capacity, simple biasing circuitry, and low cost. Nonetheless, for resonating at both frequencies, the patch elements are designed to be closely placed at less than a typical distance (0.5 $\lambda_0$) between patches. However, the close proximity causes large mutual coupling and interference with neighboring patches. To suppress such coupling between the neighboring patches, a meander-line complementary split-ring resonator (ML-CSRR) is placed under each patch in a diagonal direction. This array antenna is characterized by good multi-input multi-output (MIMO) antenna performance.

Figure 2:
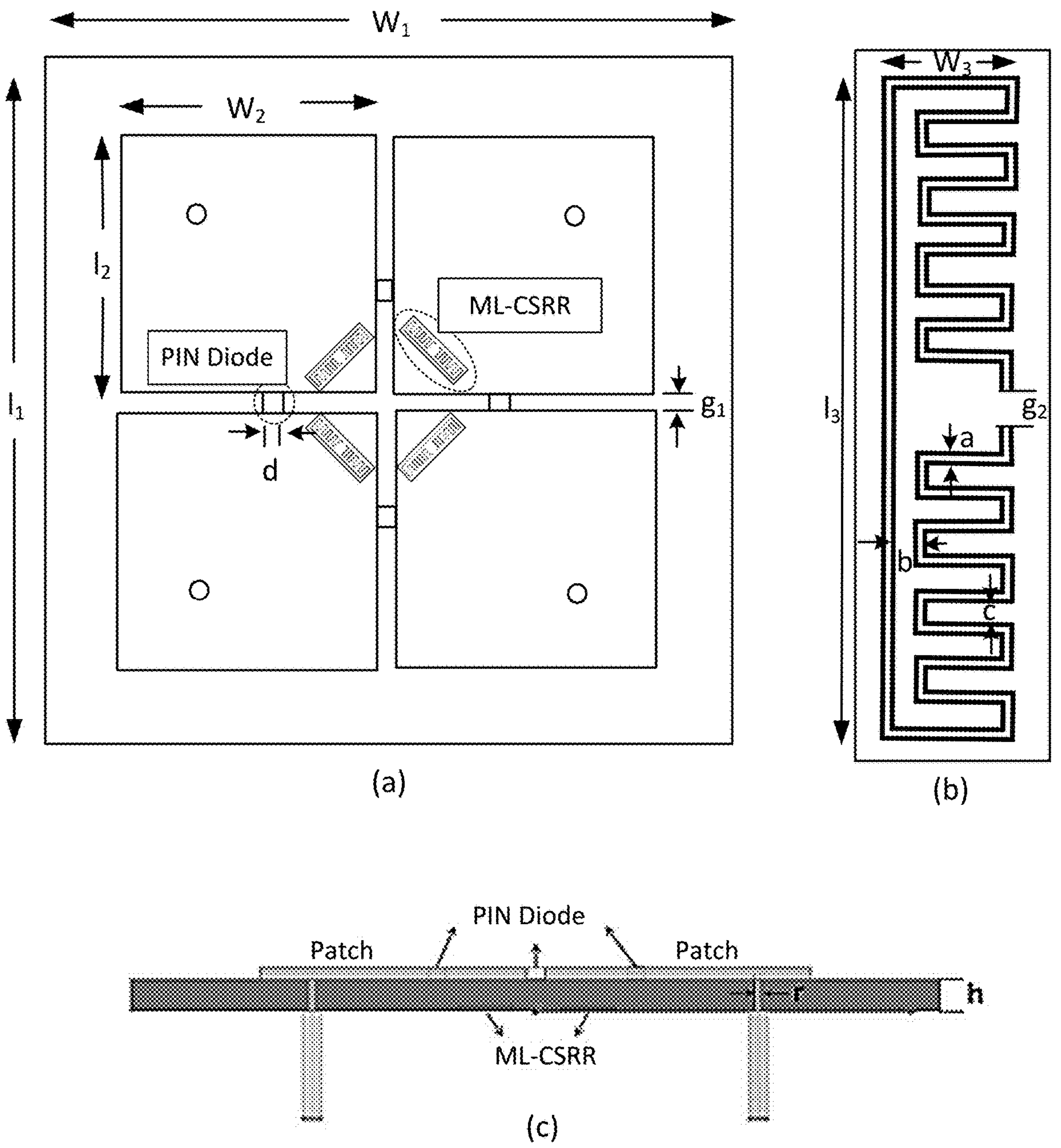
FIG. 2 shows an exemplary embodiment of a patch antenna array at various views in accordance with the present disclosure.

FIG. 2 (having parts (a), (b), (c) of various views) shows a schematic of an exemplary frequency reconfigurable 2×2 array antenna based on diagonally placed ML-CSRRs and PIN diodes drawn with full-wave 3D electromagnetic software, High Frequency Structure Simulator (HFSS, ANSYS Inc.). In particular, FIG. 2(*a*) shows a top view of the array antenna, where $W_1$, $I_1$=80 mm, $W_2$, $I_2$=29.5 mm, d=2 mm, $g_1$=2 mm. FIG. 2(*b*) shows a schematic of the ML-CSRR slots, where $W_3$=1.39 mm, $I_3$=7.06 mm, a=0.16 mm, b=0.16 mm, c=0.2 mm. FIG. 2(*c*) shows a front view of the array antenna, where r=0.298 mm, h=3.175 mm.

The patches are placed on a printing circuit board (PCB, FR-4) with a dielectric constant of 4.4 and a loss tangent of 0.02. The patches are closely placed (2 mm=0.015 $\lambda_0$) at a distance that is much smaller than a typical distance (0.5 $\lambda_0$) and is designed so to reduce the footprint of the antenna operating at target frequencies. The reduced gap between the patches causes severe interference to each patch, and the antenna resonant frequency would be changed with the different distance between patches. In accordance with embodiments of the present disclosure, meander-line (ML) slots are used since they have shown good performance to block the surface waves and good antenna efficiency over other approaches. An ML-CSRR structure with a gap of less than 200 μm performs well as a band stop filter and enhances effective capacitance and inductance.

Figure 3:
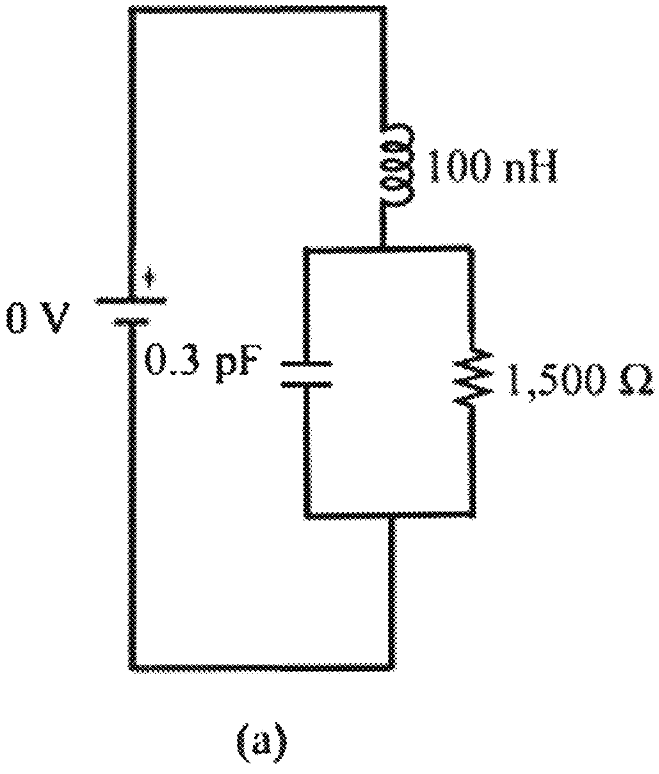
FIG. 3 shows an equivalent circuit model of a PIN diode under (a) reverse-biased condition ('off' state) and (b) forward-biased condition ('on' state) in accordance with embodiments of the present disclosure.

The surface-mounted PIN diodes are located over the gap between the neighboring patches. The PIN diode (SMP1304-085LF, Skyworks Inc.) is used as a shunt connected PIN diode and is operated in a frequency range of 10 MHz-6 GHz. FIG. 3 (having two parts: (a) and (b)) shows a lumped element model of the diode, which is formed with a turn-on resistance of 2 ohms under forward-bias (FIG. 3(*b*)), otherwise, a parallel combination of 1.5 kiloohms resistance and 0.3 pF capacitance under reverse-bias (FIG. 3(*a*)):

$$|Z|=|jwL|=(2\pi\times2.4\times10^9)\times100\times10^{-9}=1{,}500\Omega \tag{1}$$

Figure 4A:
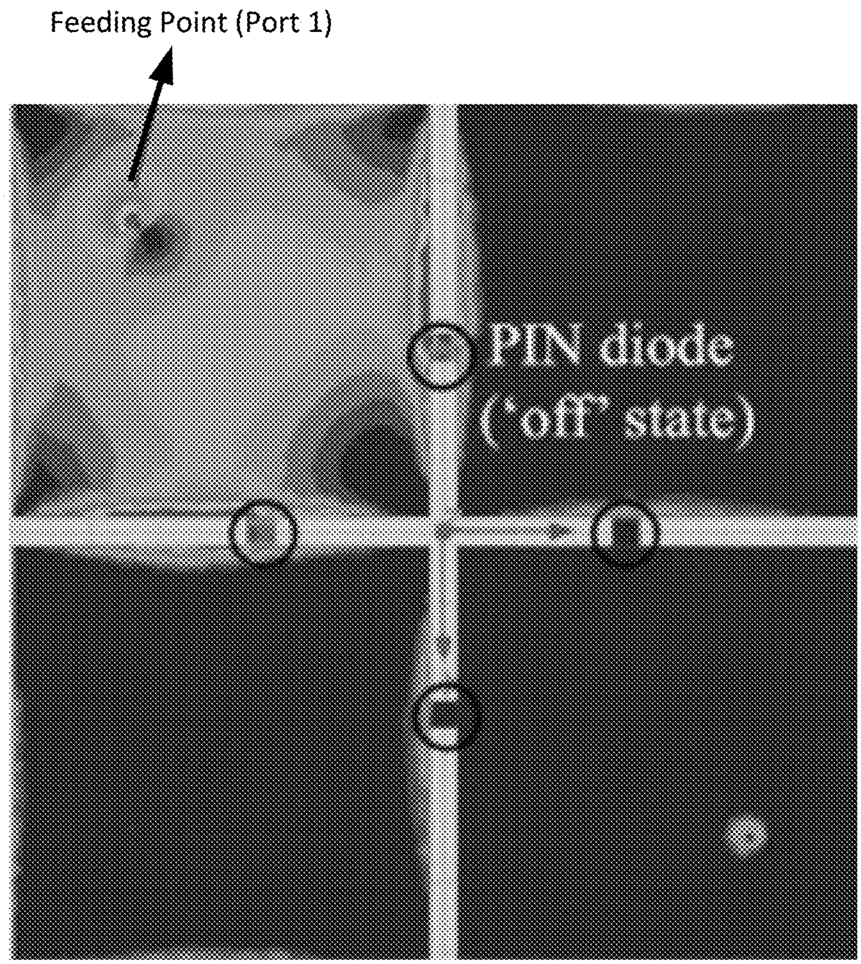
FIG. 4A shows current distribution patterns when PIN diodes are in 'off' state for an exemplary embodiment of an array antenna in accordance with embodiments of the present disclosure.
Figure 4B:
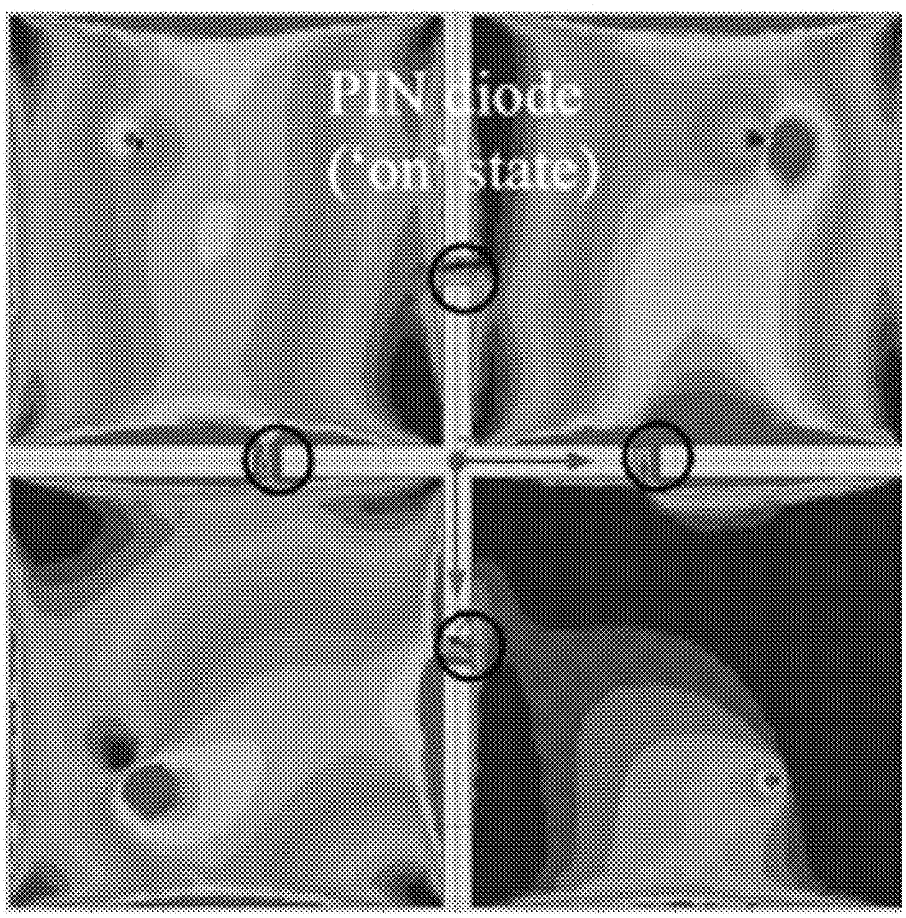
FIG. 4B shows current distribution patterns when the PIN diodes are in 'on' state for an exemplary embodiment of an array antenna in accordance with embodiments of the present disclosure.

When PIN diodes are reverse-biased ('off state), the patches function as a 2×2 array antenna with each patch of 29.5 mm×29.5 mm. On the other hand, when PIN diodes are forward-biased ('on' state), the four patches are electrically connected and the current flows on all the patches, acting as a 61 mm×61 mm single patch antenna as shown in FIGS. 4A-4B. Specifically, when port 1 is excited and terminated with 50 ohms and other ports are 50 ohms terminated, the current from port 1 cannot flow to other patches when the PIN diodes are in 'off state as shown in FIG. 4A. In contrast, when the PIN diodes are in 'on' state, the current flows to all the patches as shown in FIG. 4B.

Figure 5:
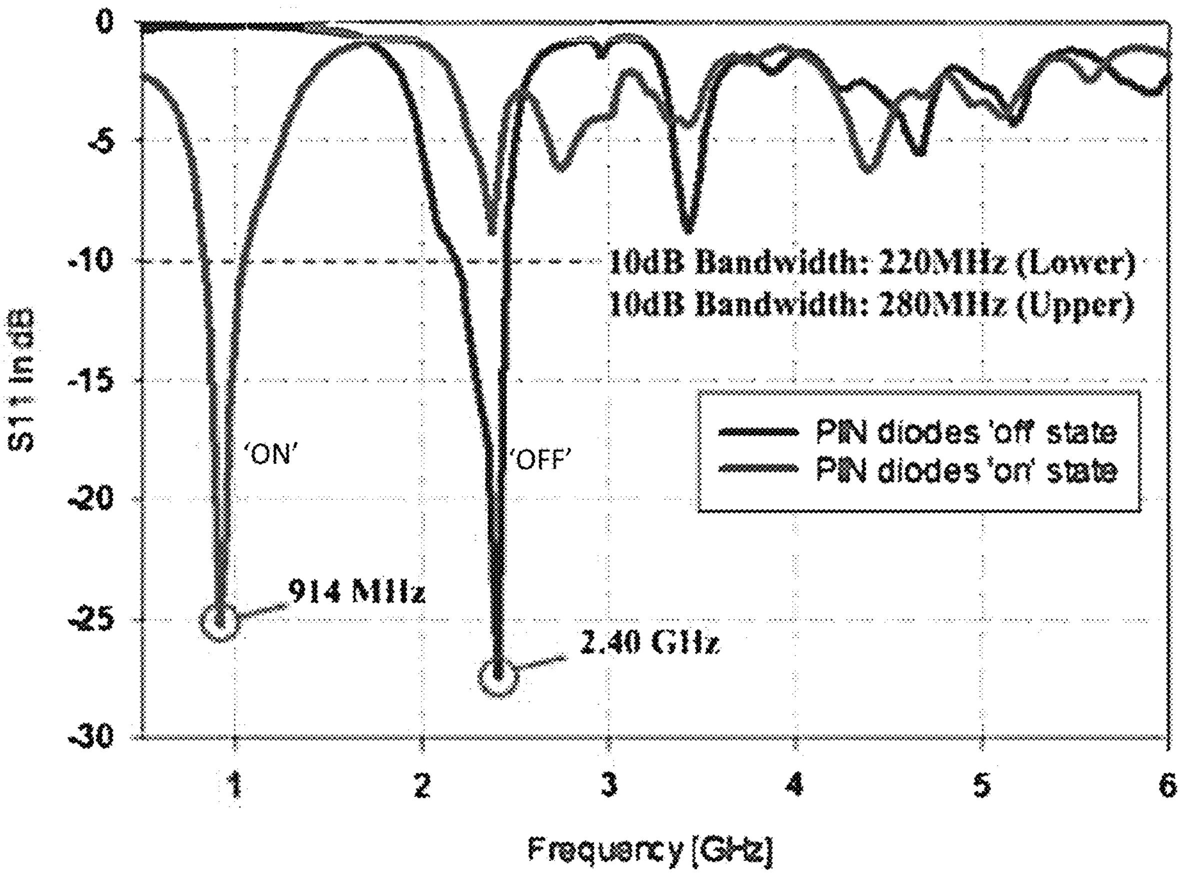
FIG. 5 shows a plot of simulated radiation frequencies of an exemplary antenna array with PIN diodes in 'on' and 'off' states.

FIG. 5 shows a simulated result using HFSS, where the resonant frequency is 2.40 GHz and the 10 dB bandwidth is 280 MHz with the PIN diodes in 'off state, and it can be operated for Bluetooth or Wi-Fi applications. On the other hand, in the 'on' state, the resonant frequency is 914 MHz, and the 10 dB bandwidth is 220 MHz, which can be used for LPWAN applications. The return loss at 914 MHz and 2.4 GHz is 25 dB and 27 dB, respectively.

Figure 6A:
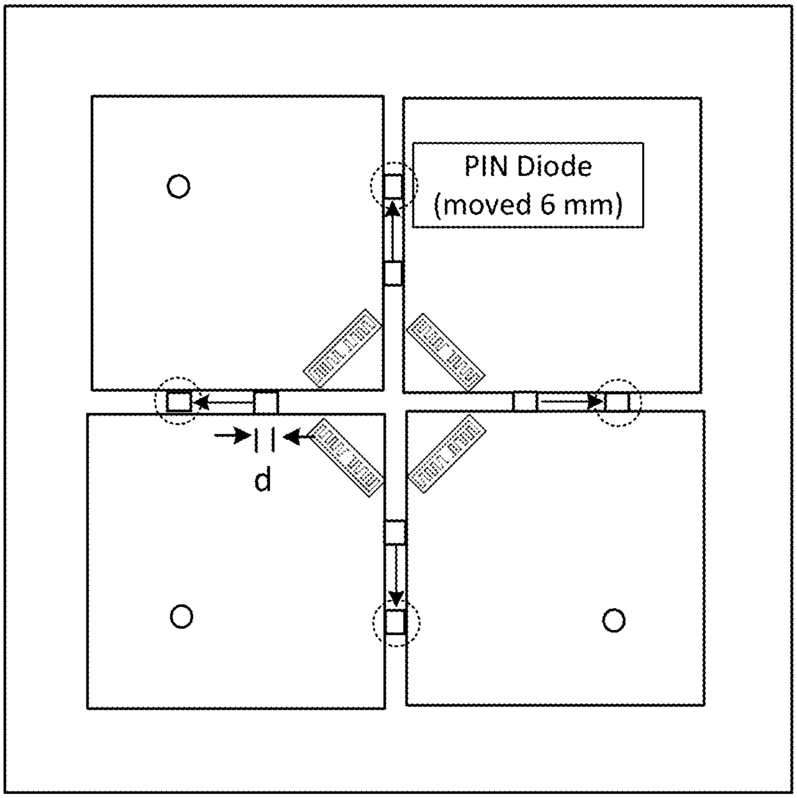
FIG. 6A shows a top view schematic of reconfiguring an exemplary array antenna by changing the PIN location in accordance with embodiments of the present disclosure.
Figure 6B:
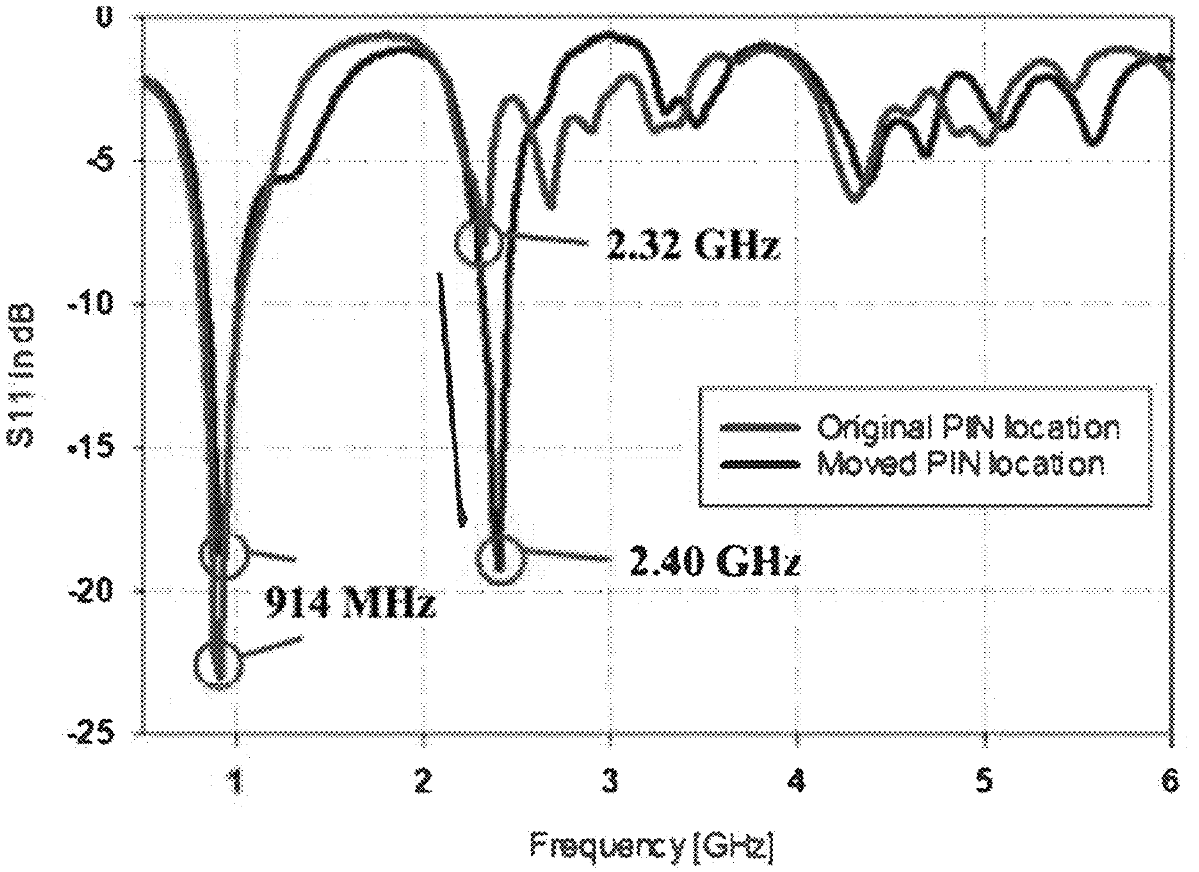
FIG. 6B shows a plot of simulated radiation frequencies for different PIN locations of FIG. 6A.

Depending on the PIN diode's location in the gap between patches, as shown in the schematic of FIG. 6A, the performance of the return losses is different. For example, the simulated frequency plot of FIG. 6B shows a single peak at 914 MHz with PINs in its original position while showing dual peaks (dual-bands), i.e. 914 MHz and 2.4 GHz, with PINs placed in shifted locations, where the new diode position is 6 mm away from its original location.

Figure 7A:
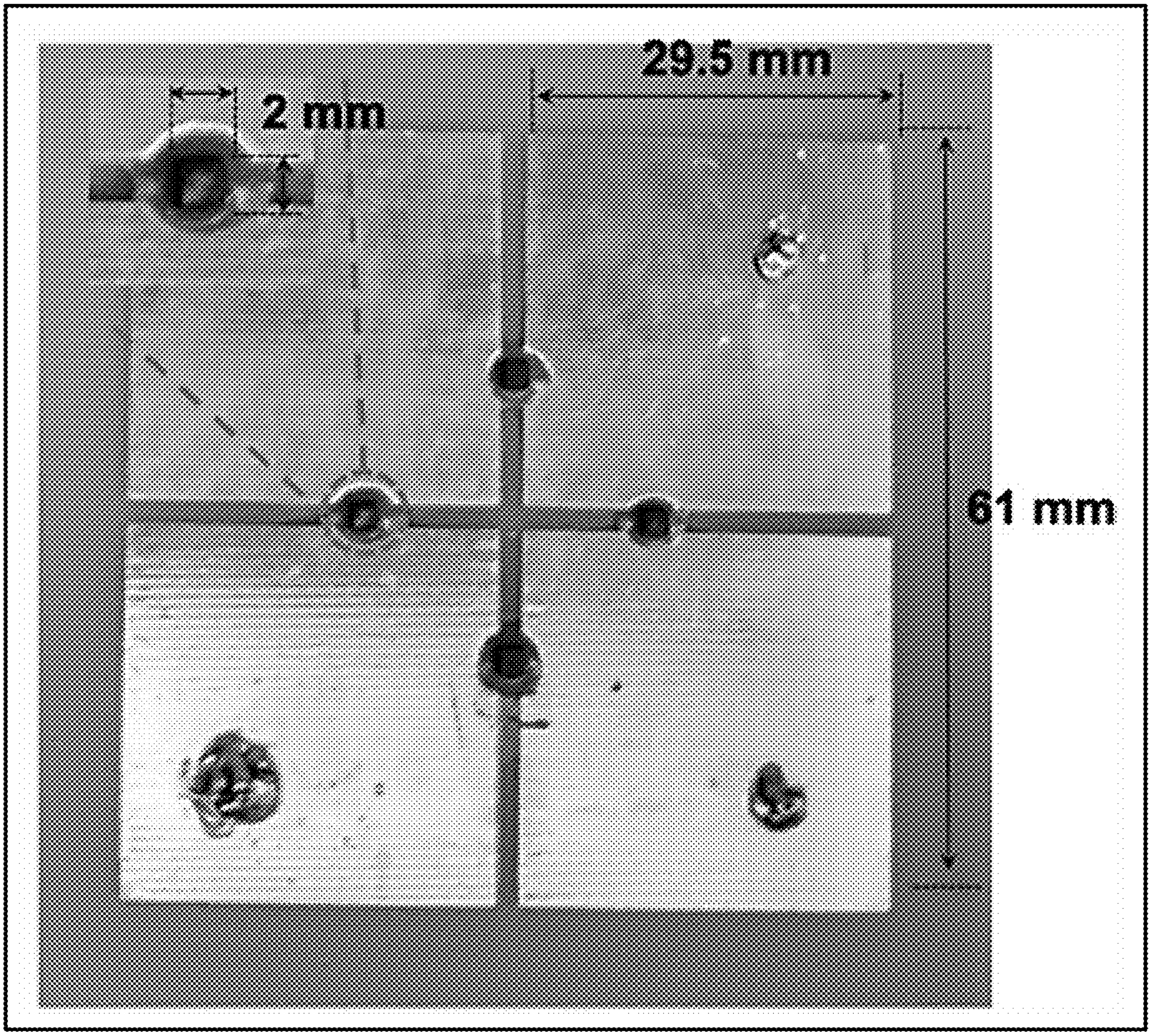
FIG. 7A shows a top view of a fabricated frequency reconfigurable 2×2 array antenna with ML-CSRRs and PIN diodes in accordance with embodiments of the present disclosure.
Figure 7B:
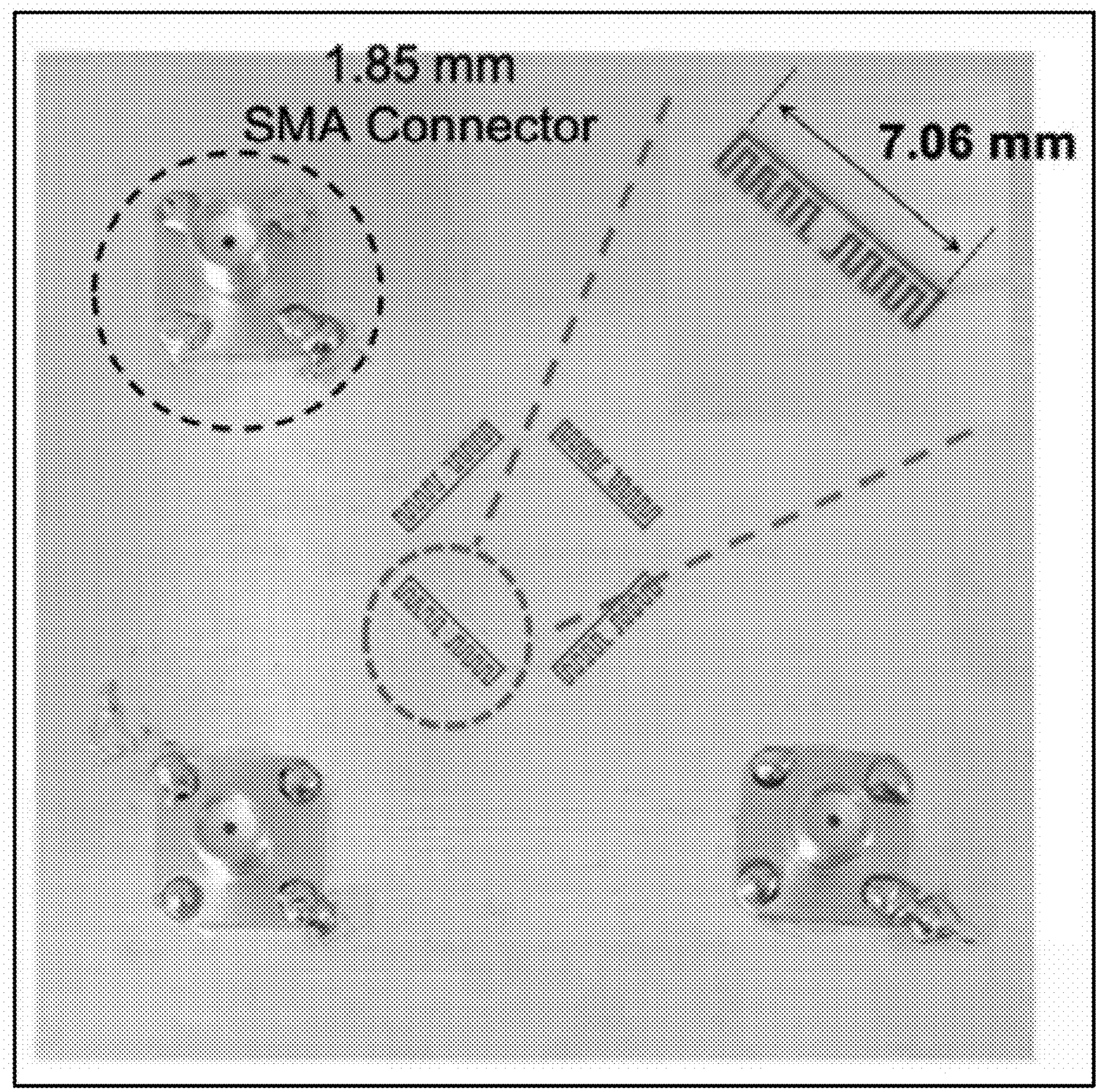
FIG. 7B shows a bottom view of a fabricated frequency reconfigurable 2×2 array antenna with ML-CSRRs and PIN diodes in accordance with FIG. 7A.

The fabricated frequency reconfigurable 2×2 patch array antenna with ML-CSRRs and PIN diodes is shown in FIGS. 7A and 7B. The patches are placed on the top surface of the substrate and the ML-CSRRs are on the bottom side, i.e. the ground plane. The PIN diodes are placed over the gaps between patches and soldered using Sn63/Pb37 solder paste and heat. After the PCB is heated in a stove, the solder paste melts, forming a mechanical and electrical connection. The total area of the frequency reconfigurable 2×2 array antenna is 61×61 $mm^2$. The antenna shows a compact size compared to other 2×2 patch array antennas operating at 2.4 GHz.

Figure 8:
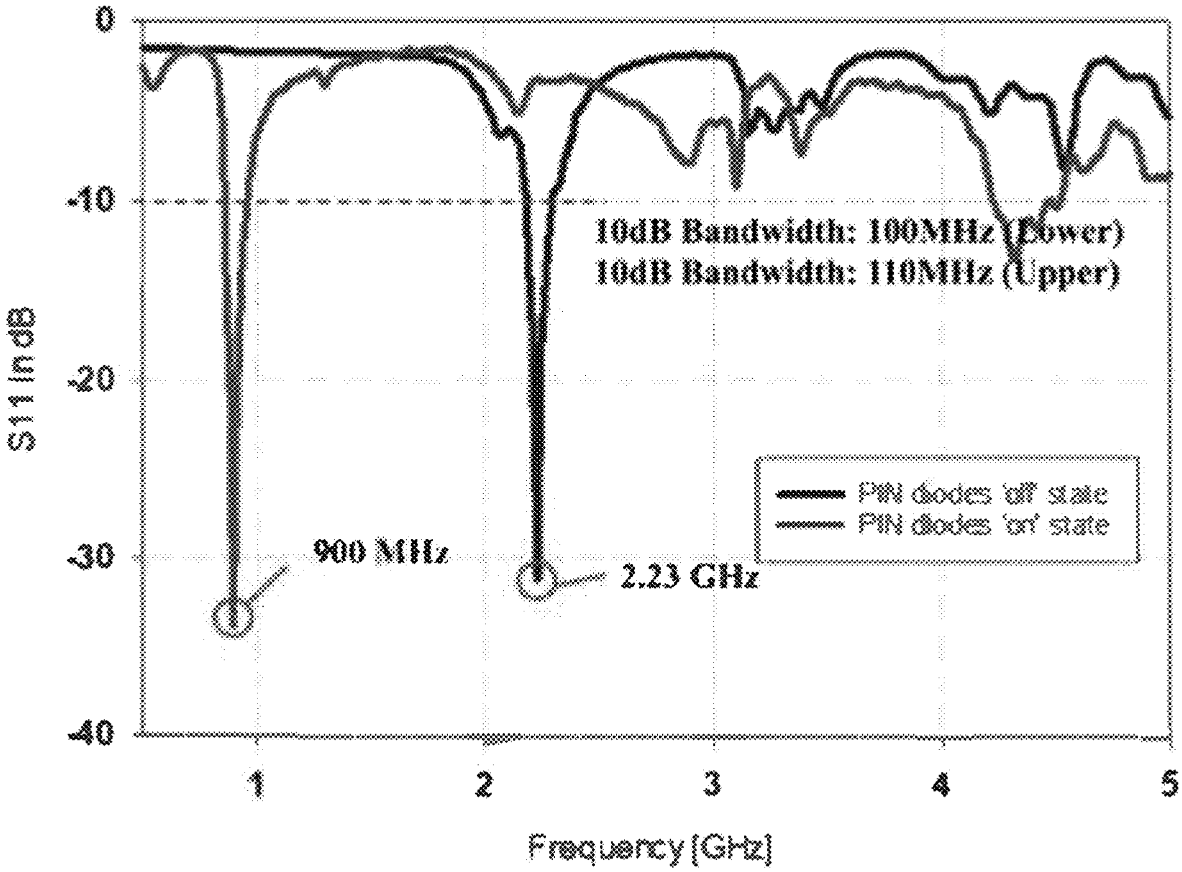
FIG. 8 shows a plot of tested radiation frequencies of a fabricated array antenna with PIN diodes in the 'on' and 'off' states in accordance with embodiments of the present disclosure.

A vector network analyzer (E5071C, Agilent Technologies) is used for measuring the return loss of the fabricated antenna. FIG. 8 shows the comparison of the measured return loss when the PIN diode is in the 'on' and 'off states. The measured resonant frequencies are 900 MHz and 2.23 GHz, and the return loss is 34 dB and 31 dB, respectively.

By comparing the obtained results, the measured results are found to be downshifted from the simulated results by 14

Figure 9:
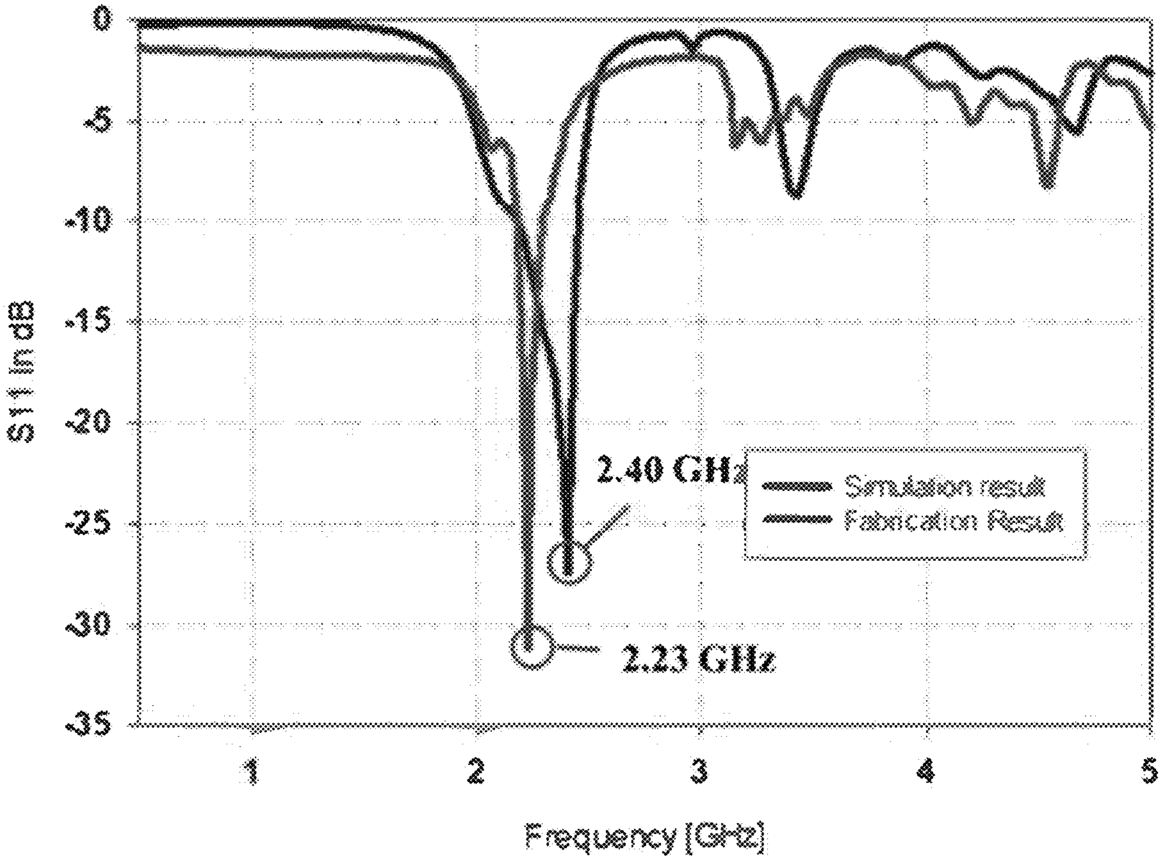
FIG. 9 shows measured and simulated results of return loss for a fabricated array antenna when the PIN diodes of FIG. 8 are in the 'off' state.
Figure 10:
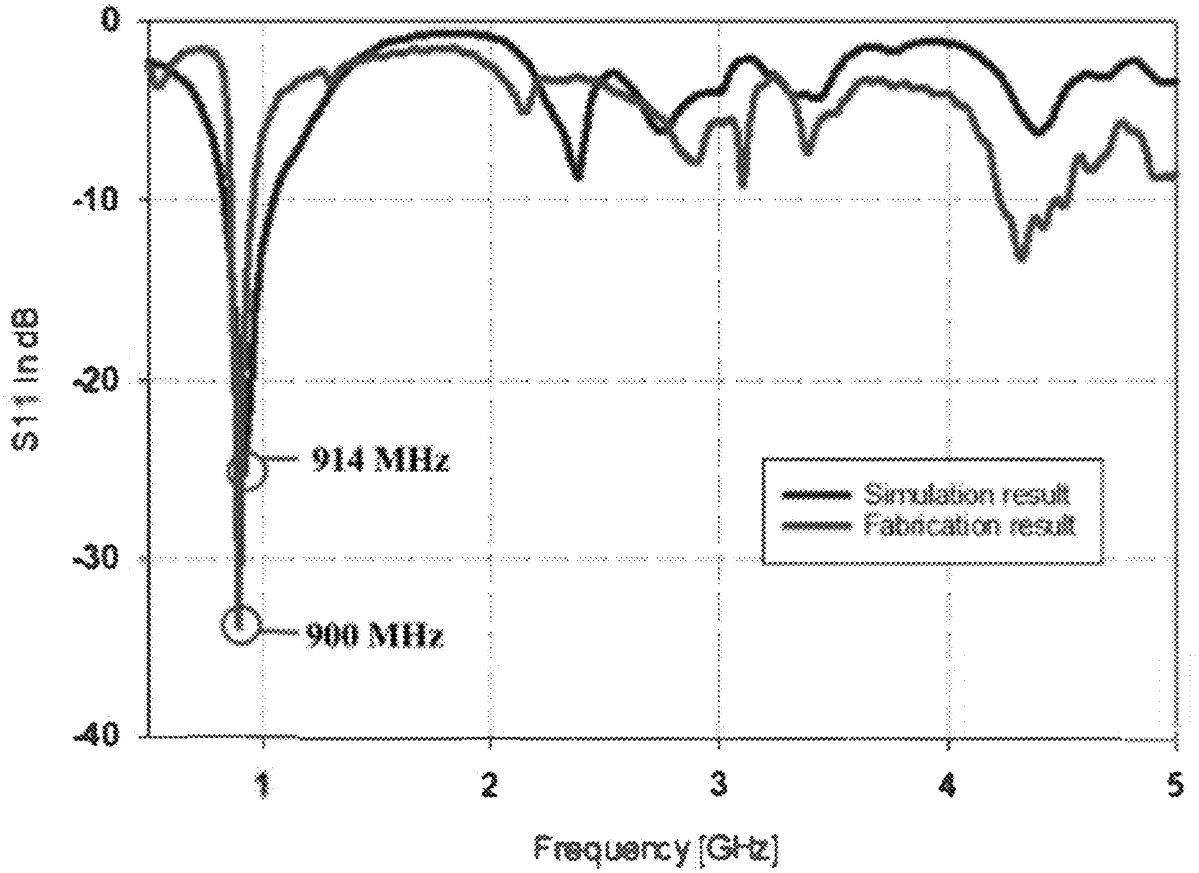
FIG. 10 shows measured and simulated results of return loss a fabricated array antenna when the PIN diodes are in the 'on' state.
Figure 11:
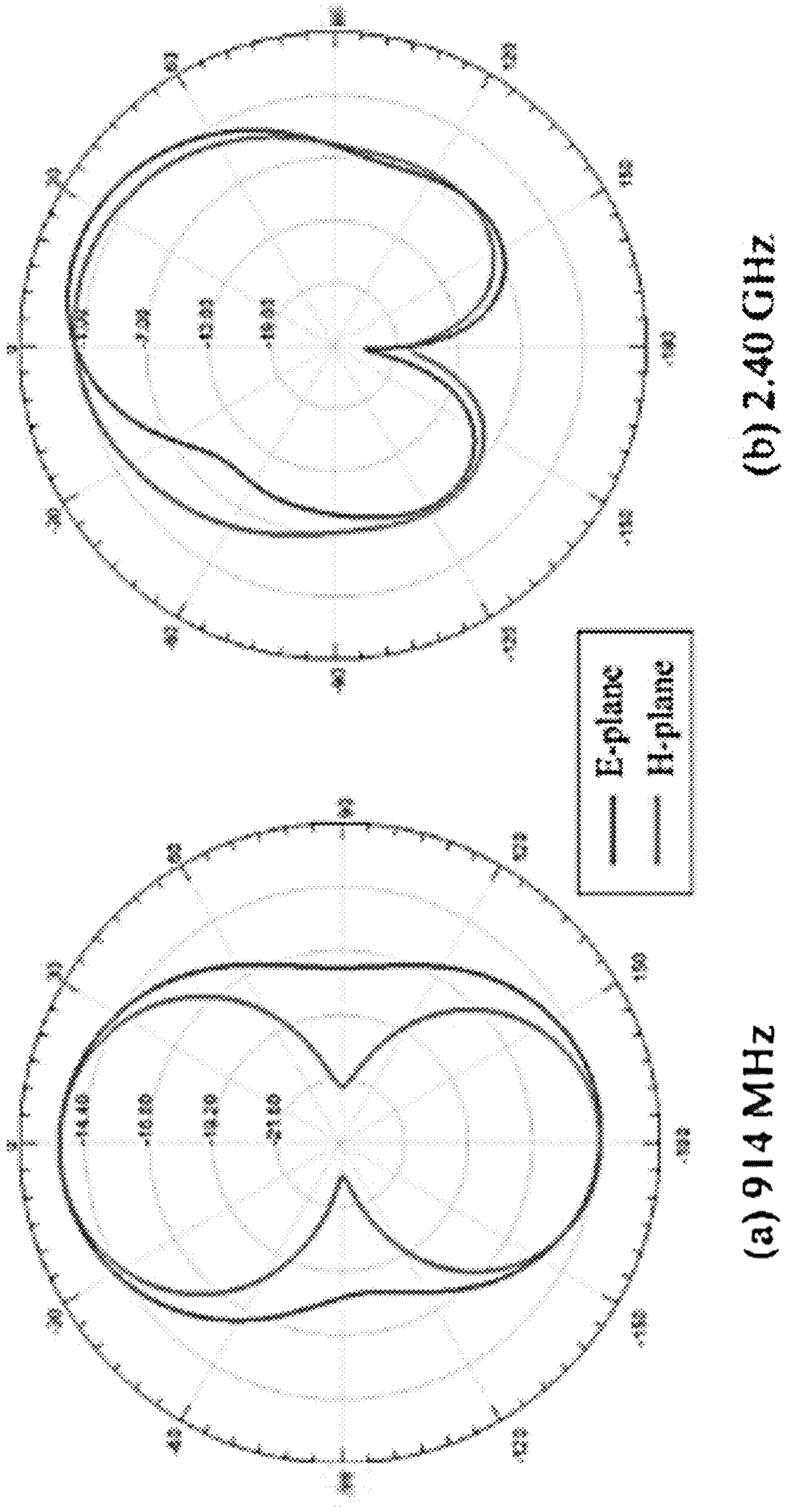
FIG. 11 shows radiation patterns of a fabricated array antenna at (a) 914 MHz and (b) 2.40 GHz.

MHz when the PIN diodes are reverse-biased, as shown in FIG. 9. With the PIN diodes being in the 'on' state (i.e. a forward-biased condition), the radiation frequency is also downshifted by 170 MHz, as shown in FIG. 10. These shifts are attributed to fabrication and integration tolerances. Although there are slight shifts between the simulated and measured frequencies, overall, they show good matching between them, supporting a proof of concept that the frequencies for the long-and short-range communications can be controlled in the event of emergency. The radiation patterns of the patch array at 914 MHz and 2.40 GHz are shown in FIG. 11, where the total gains of the antenna are −13.75 dB and −13.6 dB, respectively.

Simulation and the measured antenna designs prove that the disclosed compact array antenna can be reconfigured to cover other frequency bands by means of PIN diodes connecting the array elements. As such, a 2×2 patch array working at 2.4 GHz can be converted to a single patch antenna at 915 MHz using electronic bandgap (EBG) structures on the ground plane to reduce the coupling between antennas and hence decreasing the distance between antenna elements in the array.

Figure 12A:
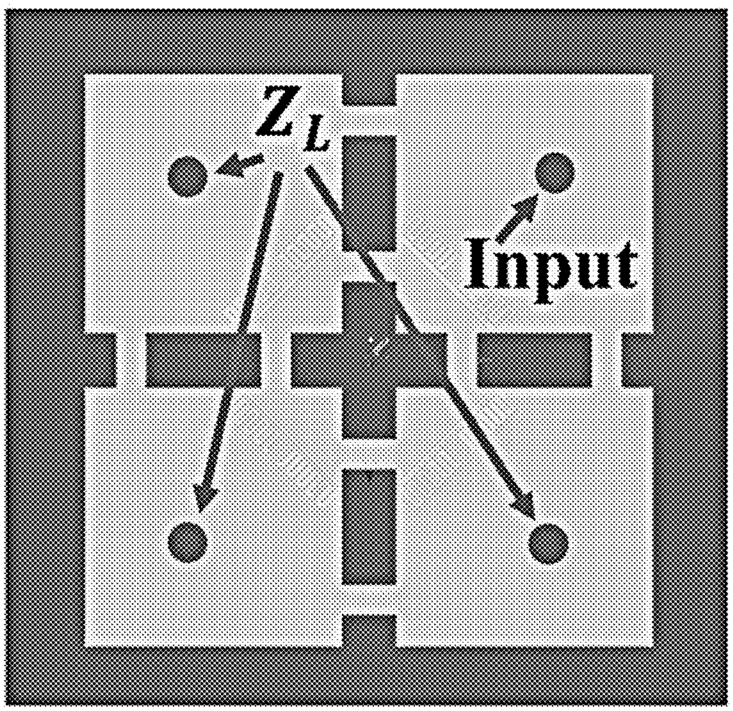
FIGS. 12A-12C show a 2×2 array antenna that can be reconfigured as an 8×8 array antenna in accordance with embodiments of the present disclosure.
Figure 12B:
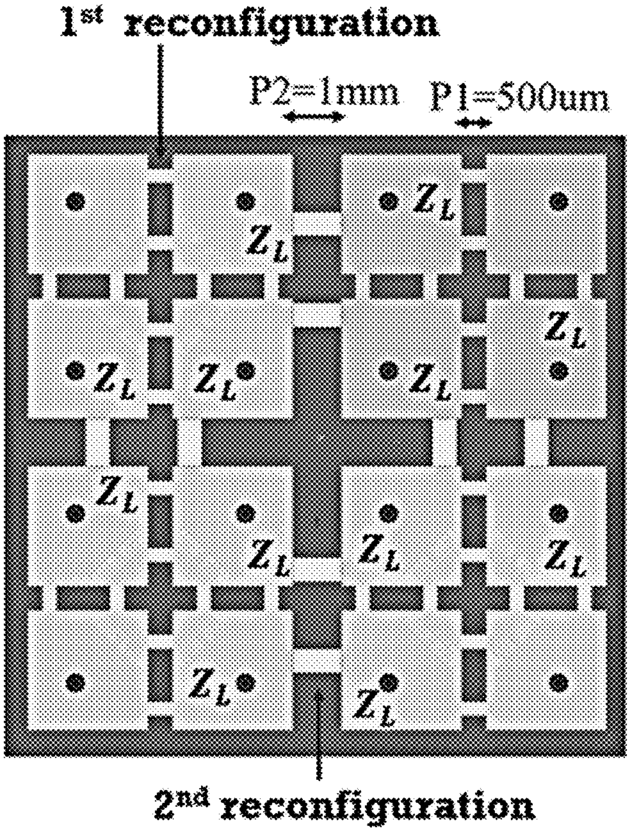
Figure 12C:
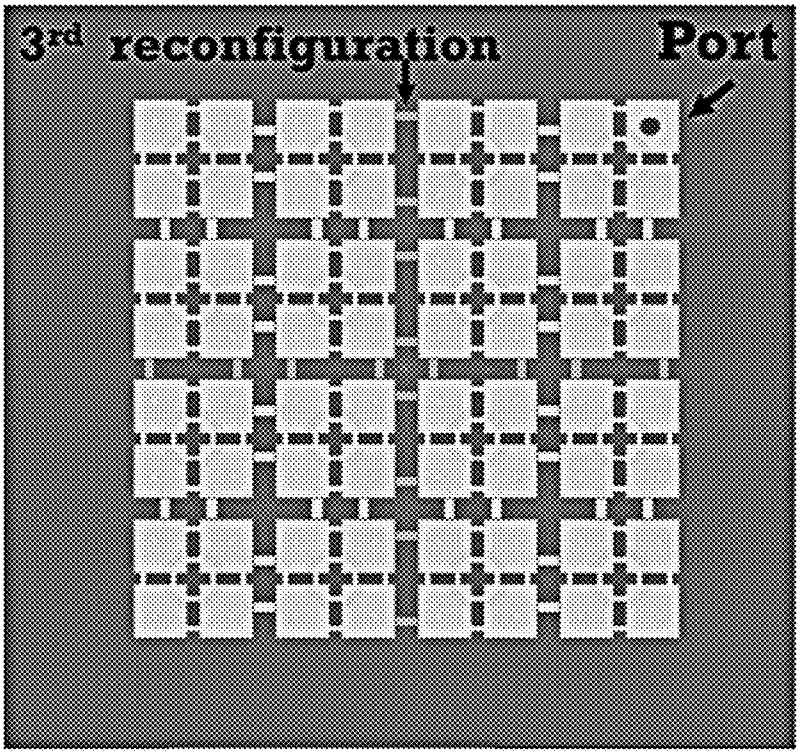

In accordance with embodiments of the present disclosure, this approach is scalable to cover multiple frequency bands. To this end, as an illustrative and non-limiting example, an 8×8 patch array at 28 GHz can be designed on a glass substrate to cover an mmWave 5G communication band. As shown in FIGS. 12A-12C, three reconfiguration steps can be executed to the array to make it work in lower frequency bands.

Figure 13:
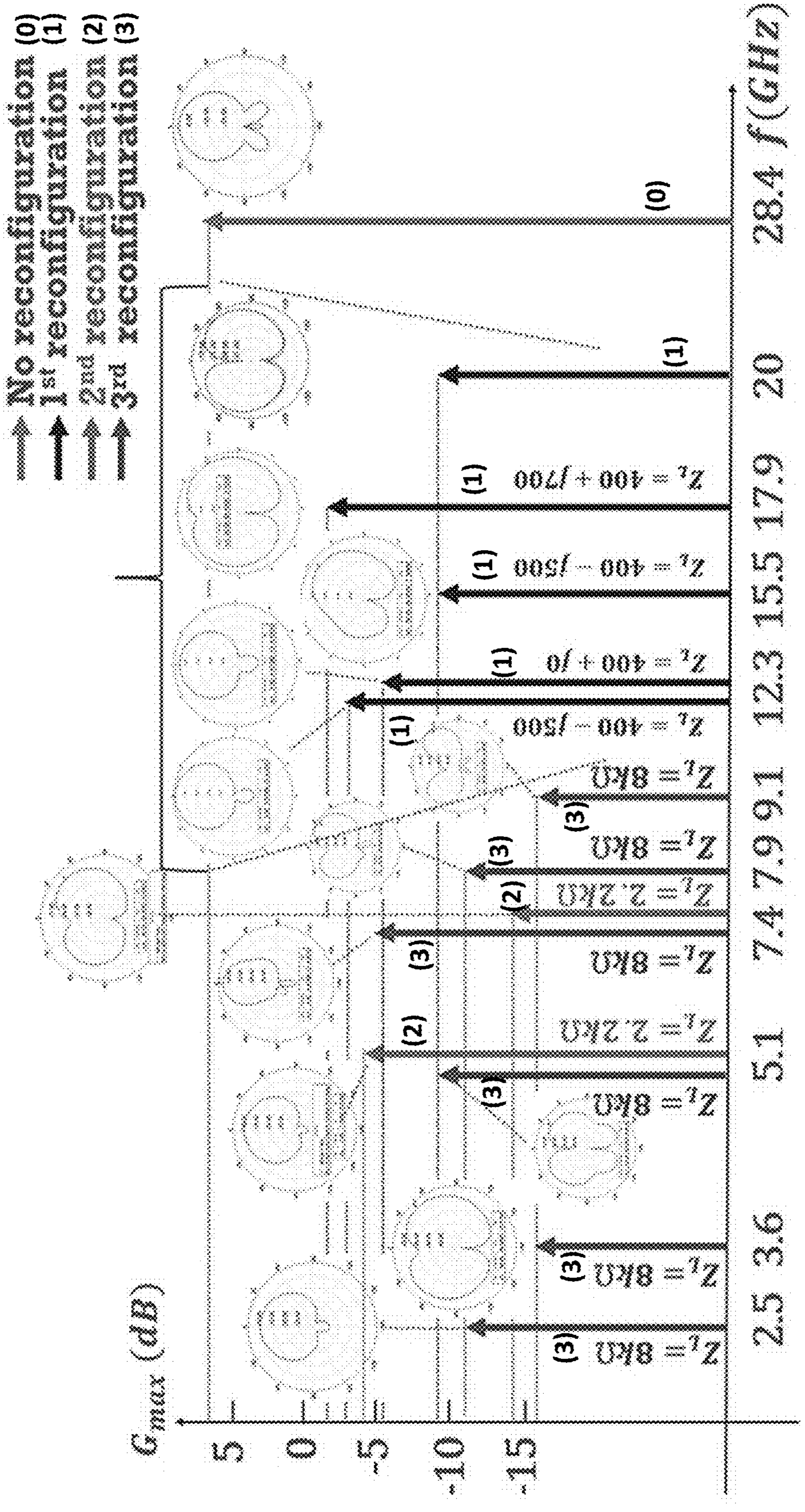
FIG. 13 shows a plot of resonant frequencies, radiation patterns, and maximum gains of a reconfigured 8×8 antenna array covering multiple frequencies spanning from 2.5 GHz to 28.4 GHz in accordance with embodiments of the present disclosure.

In FIG. 12B, four diode pairs convert a 28 GHz 2×2 array (as shown in FIG. 12A) to a bigger antenna (Tile) suitable for X band and Ku band frequencies (as shown in FIG. 12C). In addition, tuning the antenna loads provides multiple resonant frequencies, as shown in the frequency plot of FIG. 13, with corresponding maximum gain and radiation pattern. At each configuration step, one of the four antennas is connected to a 50 Ω input and the other three are loaded with $Z_L$. The second configuration is done by connecting 4 tiles together by more diodes, as shown in FIG. 12B, which can result in antennas working at 5.1 GHz and 7 GHz. Finally, the third reconfiguration can convert an 8×8 array antenna to a single antenna with multiple frequencies spanning from 2.5 GHz to 9 GHz, as illustrated in the frequency plot of FIG. 13.

In addition to providing multirange communications, exemplary systems and methods of the present disclosure can be used to prevent electromagnetic interference (EMI) attacks and reinforce hardware security by controlling the radiation pattern. Consider that electromagnetic interference (EMI) and information security are critical issues in wireless communications. EMI is unexpected interference by an external source in an electrical circuit. EMI degrades the performance of the devices and even worse discontinues working. Often, EMI has been used as a jamming signal in warfare. In some other cases, for a single-antenna system, information can be leaked by an eavesdropper's attack, and the proposed array antenna system might be a solution for intensifying physical layer security (PHY-security).

Figure 14A:
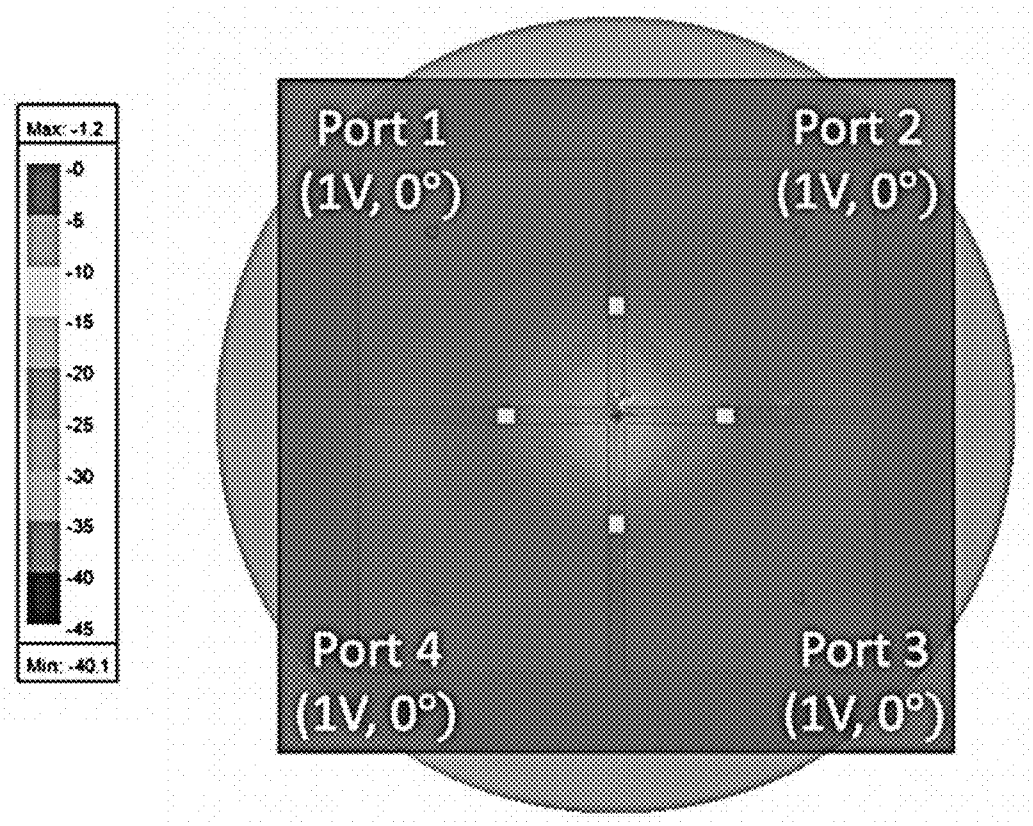
FIG. 14A shows a radiation pattern when all ports of an exemplary 2×2 array antenna are excited by a 1V and 0° phase voltage source.
Figure 14B:
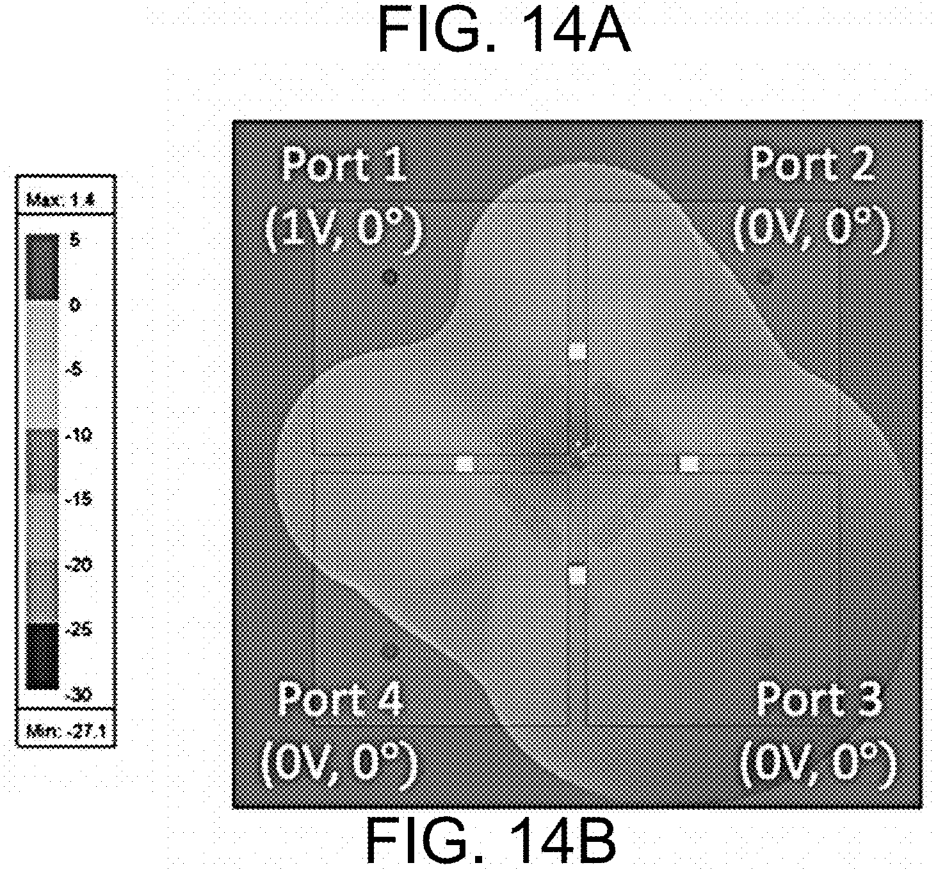
FIG. 14B shows a radiation pattern when only Port 1 of an exemplary 2×2 array antenna is excited by a 1V and 0° phase voltage source.
Figure 14C:
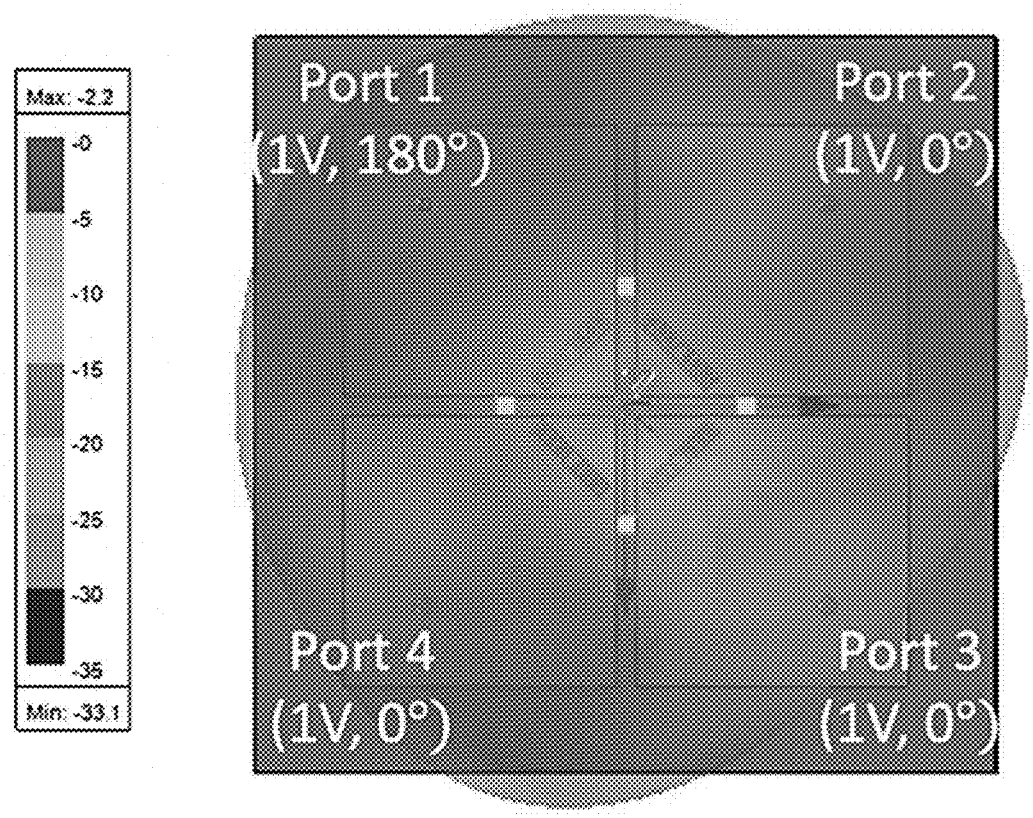
FIG. 14C shows a radiation pattern when all ports of an exemplary 2×2 array antenna are excited by a 1V and 180° voltage source.
Figure 14D:
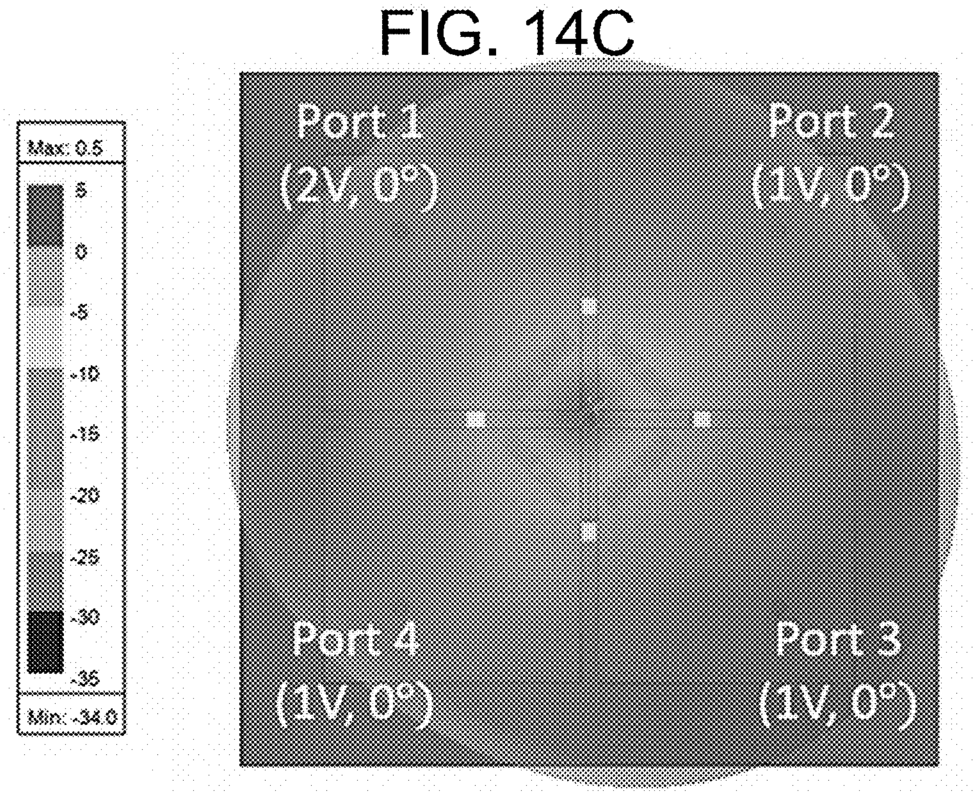
FIG. 14D shows a radiation pattern when Port 1 of an exemplary 2×2 array antenna is excited with a 2V voltage source while other ports are excited with a 1V voltage source.

To prevent EMI attacks and reinforce hardware security, an exemplary array antenna can be operated to control the radiation pattern. Reshaping the null to an EMI source or an eavesdropper can decrease the effect of EMI or avoid the jamming attack. FIGS. 14A-14D show various 3D radiation patterns of an exemplary array antenna of the present disclosure by adjusting source power and/or phase. FIG. 14A shows when all the ports are excited by 1V and 0-degree phase, the antenna depicts an Omni-directional radiation pattern and a null to the vertical direction which means avoiding EMI or jamming signals from the top and bottom of the antenna. If only Port 1 is excited and the other ports are properly terminated, nulls are directed to the Ports 2 and 3 sides as shown in FIG. 14B. On the other hand, when all the ports are excited and Port 1 changes its phase from 0-degree to 180-degree, the null's direction to Port 3 is illustrated in FIG. 14C, and FIG. 14D shows when increasing the exciting voltage, the antenna has more robust directivity than a typical power source. This radiation pattern controllability helps prevent EMI issues in specific sites and at home, which plays an important role in the future smart home. In addition, it helps secure seamless antenna operations without communication interruption or loss.

In brief, the present disclosure presents various embodiments of systems and apparatuses for a compact frequency reconfigurable array antenna and methods related thereto. One embodiment of such an array antenna comprises a compact frequency reconfigurable 2×2 array antenna based on diagonally placed meander-line (ML) complementary split-ring resonator (CSRR) decouplers and PIN diodes. The ML-CSRR structures are placed on the ground plane for the reduction of mutual coupling between narrowly spaced neighboring patches (e.g., 2 mm, 0.015 $\lambda_0$). Surface mount PIN diodes are connected between patches on the top surface and their on/off conditions are controlled by DC bias. Accordingly, the PIN diodes act as switches enabling a tuning capability between 2.4 GHz and 914 MHz bands. As such, in various embodiments, the antenna operates at 2.4 GHz when PIN diodes are reverse-biased (off-state), while it is reconfigured to operate at 914 MHz when the PIN diodes are changed to forward-biased (on-state). Simulated and measured results demonstrate at 2.4 GHz, when the switch is in off-state, an exemplary antenna can be used for short-range wireless communications such as Wi-Fi and Bluetooth, while at 914 MHz, when the switch is in on-state, it can be planned for the usage of Public Protection and Disaster Relief (PPDR) with the long-range wireless communication technology including low power wide area networks (LPWAN). Thus, systems and method of the present disclosure are applicable not only for multi-range wireless communications but also for the post-disaster scenario toward recovering communications by using a UAV-assisted base station. This type of reconfigurable device can also contribute to the enhancement of spectrum efficiency in the IoT era.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

The invention claimed is:

1. An array antenna system comprising:

a substrate;

an array of patch antennas positioned on the substrate;

a plurality of PIN diodes placed on a top surface of the substrate, wherein individual PIN diodes are located in individual gaps between respective ones of the patch antennas; and a plurality of meander-line (ML) complementary split-ring resonator (CSRR) decouplers placed on a bottom surface of the substrate, wherein individual ML-CSRR decouplers are placed under individual patch antennas in a diagonal direction.

2. The system of claim 1, wherein the array of patch antennas is a 2×2 array.

3. The system of claim 2, wherein a total area of the 2×2 array is approximately 61×61 $mm^2$.

4. The system of claim 2, wherein the array of patch antennas is configured to operate at substantially 914 MHz and at 2.4 GHz.

5. The system of claim 1, wherein a width of the individual gaps between patch antennas is less than 0.5 $\lambda_0$.

6. The system of claim 1, wherein the PIN diodes operate in a frequency range of 10 MHz-6 GHz.

7. The system of claim 2, wherein the array of patch antennas function as a 2×2 array antenna at a resonant frequency of 2.4 GHz when the PIN diodes are reverse-biased in an off state, wherein the array of patch antennas function as a single patch antenna at a resonant frequency of substantially 915 MHz when PIN diodes are forward-biased in an on state.

8. The system of claim 2, wherein a resonant frequency of the array of patch antennas is 280 MHz when the PIN diodes are reverse-biased in an off state, wherein the resonant frequency of the array of patch antennas is substantially 914 MHz when the PIN diodes are forward-biased in an on state.

9. The system of claim 1, wherein the PIN diodes are positioned at a particular location in the individual gaps to enable a single band operation of the array of patch antennas.

10. The system of claim 1, wherein the PIN diodes are positioned at a particular location in the individual gaps to enable a dual-band operation of the array of patch antennas.

11. The system of claim 10, wherein the array of patch antennas is an 8×8 array with dual-band frequencies at substantially 5.1 GHz and 7 GHz.

12. The system of claim 1, wherein the array of patch antennas is an 8×8 array that acts as a single antenna with multiple frequencies spanning from 2.5 GHz to 9 GHz.

13. A method for wireless power transfer communications comprising:

providing an array of patch antennas having a plurality of PIN diodes, individual ones of the plurality of PIN diodes located in individual gaps between respective ones of the patch antennas, wherein the array of patch antennas are integrated with a plurality of meander-line (ML) complementary split-ring resonator (CSRR) decouplers under individual patch antennas in a diagonal direction;

enabling the array of patch antennas to function in a first mode at a first frequency when the PIN diodes are reverse-biased in an off state; and enabling the array of patch antennas to function in a second mode at a second frequency when the PIN diodes are forward-biased in an on state.

14. The method of claim 13, wherein the array of patch antennas is a 2×2 array, the first frequency is substantially 2.4 GHz, and the second frequency is substantially 914 MHz.

15. The method of claim 13, wherein a width of the individual gaps between patch antennas is less than 0.5 $\lambda_0$.

16. The method of claim 13, wherein the PIN diodes operate in a frequency range of 10 MHz-6 GHz.

17. The method of claim 13, further comprising positioning the PIN diodes at a particular location in the individual gaps to enable a single band operation of the array of patch antennas.

18. The method of claim 13, further comprising positioning the PIN diodes at a particular location in the individual gaps to enable a dual-band operation of the array of patch antennas.

19. The method of claim 13, wherein the array of patch antennas is an 8×8 array with dual-band frequencies at substantially 5.1 GHz and 7 GHz under the first mode.

20. The method of claim 13, wherein the array of patch antennas is an 8×8 array that acts as a single antenna with multiple frequencies spanning from 2.5 GHz to 9 GHz under the second mode.

* * * * *